June 30, 1931.  H. C. J. AARTS  1,812,230
PROCESS FOR PREPARING ACTIVE ELEMENTARY CARBON FROM SUBSTANCES
SUCH AS CARBONMONOXIDE AND CARBONMONOXIDE CONTAINING GASES
Filed May 4, 1929

GENERATOR  PURIFICATION  REACTION CHAMBER
± 1300°C  ± 300-500°C $CO_2 + C \longrightarrow \boxed{\phantom{x}} \longrightarrow 2CO \longrightarrow \boxed{\phantom{x}} \longrightarrow C + CO_2$ H. C. J. Aarts
INVENTOR
By: Marks Heller
ATTYS.

Patented June 30, 1931

1,812,230

UNITED STATES PATENT OFFICE

HENDRIKUS CORNELIS JOSEPHUS AARTS, OF DONGEN, NETHERLANDS, ASSIGNOR TO THE GENERAL CARBONALPHA COMPANY, OF WILMINGTON, DELAWARE

PROCESS FOR PREPARING ACTIVE, ELEMENTARY CARBON FROM SUBSTANCES SUCH AS CARBONMONOXIDE AND CARBONMONOXIDE CONTAINING GASES

Application filed May 4, 1929, Serial No. 360,604, and in the Netherlands May 4, 1928.

The invention relates to a process for preparing active elementary carbon from carbonmonoxide or carbonmonoxide containing gases.

It is already known that carbonmonoxide may be decomposed by means of a catalyst into carbon and carbondioxide at temperatures of 300 to 500° C. However with the preparation of active carbon by the application of this reaction a product is obtained which is highly polluted with iron in consequence whereof it is unavailable for many purposes thus for instance as a motor fuel and as a decolorizing means for various liquids as e. g. saccharine solutions, molten eatable fats and oils, glycerine, wine, etc.

The active carbon obtained according to the invention constitutes an iron free product the above mentioned drawbacks being entirely eliminated. The invention is characterized by the use of carbon formed with the decomposition of carbonmonoxide as a catalyst.

In order to start the reaction an extraneous catalyst may be used which is subsequently removed either by removal from the gases or by use of the autocaltalytical action of the formed carbon at another place.

The product prepared according to the invention may be used for various purposes for instance:

1. As a black dye or pigment in the rubber, ink, dye and varnish manufacture, for preparing black-lead polish, leather, grease, etc.
2. As an adsorbent and decolorizing means in the sugar industry, the oil and fat industry, etc. and
3. As a motor fuel.

The present process aims at preparing carbon in its purest and most valuable form from any carbon containing complex. To this purpose the carbonaceous raw materials are decomposed by gasification in a known manner and subsequently the carbon separated in elementary almost molecular condition by decomposition of the carbonmonoxide. As a principal source producer gas may be applied which is passed into the catalysis chambers preferably at a temperature of 400° C. and if necessary under pressure but preferably under normal pressure.

As the carbondioxide formed with the separation of carbon reacts with the carbon present in the raw material according to the equation:

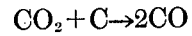

$$CO_2 + C \rightarrow 2CO$$

under formation of fresh quantities of carbonmonoxide, a cycle process occurs, the formed carbondioxide being returned into the generator and transformed therein by reduction into carbonmonoxide. Therefore the entire carbon content of any carbon containing complex may be practically transformed into elementary condition without any losses but those caused by maintaining the temperature in the generator and compensating the radiation of heat of the devices.

The process according to the invention described below fits into the following working scheme:

The carbonaceous raw materials (charcoal, brown-coal, peat, wood, etc.) are subjected to dry distillation either in the same or in another factory. The residuary coke is gasified in a generator which may be operated at will with periodical or nonperiodical air and gas working. The produced gases preferably after desulphurization and if necessary after electrostatic separation of the pollutions are cooled down at the desired temperature and decomposed according to the invention in the manner described below into carbon and carbondioxide containing gases. The flow of gas now composed of carbondioxide and of carbonmonoxide which has not taken part in the reaction is returned into the generator wherein the carbondioxide reacts with the carbon of the cokes, according to the above equation under formation of carbonmonoxide which is returned through the plant.

In consequence of this cycle the carbonmonoxide is entirely decomposed and therefore the total carbon complex transformed into pure, iron free, elementary, almost molecular carbon with prior separation of water and distillation products and dry ash as residue with no other losses as caused by maintaining the required temperature. In practice 700 pounds of carbon may be obtained from 1000 pounds of charcoal in this manner. Therefore reckoning with an unfavorable average, 2000 pounds of charcoal are needed to obtain 1000 pounds of elementary carbon.

With the application of the process according to the invention with relation to the above statement one may proceed as follows:

The carbon derived from a prior operation is introduced into the reaction chamber. The carbonmonoxide containing gases are passed at a temperature of 300–500° C. over said carbon and the reaction starts. With a view to the autocatalytical action of the carbon it is desirable especially in the beginning to operate at a temperature as low as possible between said limits as the carbon produced at lower temperatures possesses the highest catalytic activity. In this stage of the reaction it is preferable to sacrifice during a short period the speed of reaction to the preparation of a very active catalyst. With this and the hereafter described embodiments of the process according to the invention preferably care is taken to keep the already produced carbon in motion so that the bulk thereof is present in the form of a cloud and the contact between the gas and the autocatalytically active carbon is as perfect and as good as possible.

According to another embodiment of the present invention the reaction is started by means of a small quantity of an extraneous catalyst e. g. iron oxide which is dispersed in the gas. The carbon formed thereby directly takes the part of the iron oxide. The extraneous catalyst is gradually removed with the formed carbon or with the gas which may be easily controlled by analysis of the carbon. As soon as the produced carbon contains 100% of C it may be taken that the extraneous catalyst has been removed from the system.

Also a motionless or resting extraneous catalyst may be used as inoculator which is removed after a sufficient quantity of carbon has been formed. A variant of this process consists in not removing the extraneous catalyst but in maintaining the gases after leaving the space containing said extraneous catalyst at a temperature most suitable to the autocatalytical action of carbon in order to carry out the process, according to the invention in said space. The latter method constitutes in two respects an improvement of the known art, first for the reason that arresting catalyst if it should not fly away like dust possesses such a small superficial area that it becomes necessary to keep the gases in contact therewith as long as possible so that in practice a carbon is precipitated in the catalyst proper and a mixture of iron oxide, iron carbon compound and carbon results from which the iron never can be separated, and second for the reason that if it is attempted to separately precipitate the carbon, the carbon containing gas would certainly be cooled down below the range of temperature in which the carbon can develop a catalyst action. Therefore in the latter case a smaller yield will be obtained as with the present process according to which the gas after having passed the extraneous catalyst is maintained at a temperature at which the autocatalytical action of the carbon readily progresses.

From experiments it appeared that a gas containing 100% of CO and being passed at 410–420° C. over a catalyst containing 100% of carbon showed a carbondioxide content of 38% which was ascertained half an hour after the extraneous inoculating catalyst present in the boat had been removed.

The invention comprises all kinds of processes adapted to prepare elementary active carbon from carbonmonoxide and carbonmonoxide containing gases with application of carbon obtained by decomposition of carbonmonoxide as a catalyst with exception of those processes which permanently require an extraneous catalyst. Without exception the latter processes have the drawback of producing a polluted product and giving a smaller yield. However the invention comprises the use of extraneous catalysts serving only for the purpose to start the reaction, said catalysts being subsequently removed from the system either by removal from the gases or by application of the autocatalytic action of the formed carbon at another place.

I claim:

A process for preparing active elementary carbon from substances such as carbonmonoxide and carbonmonoxide containing gases, characterized in applying as a catalyst carbon obtained by decomposition of carbonmonoxide and in starting the reaction by means of an extraneous catalyst and maintaining the gases after their leaving the space containing said extraneous catalyst at a temperature suitable to the autocatalytical action of carbon.

In testimony whereof I affix my signature.

HENDRIKUS CORNELIS JOSEPHUS AARTS.